Nov. 13, 1928.
A. C. KING ET AL
1,691,484
ANTITHEFT DEVICE FOR MOTOR VEHICLES
Filed April 26, 1927
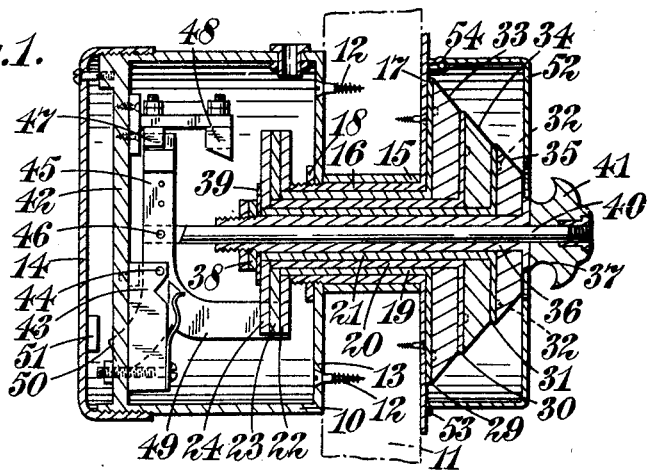
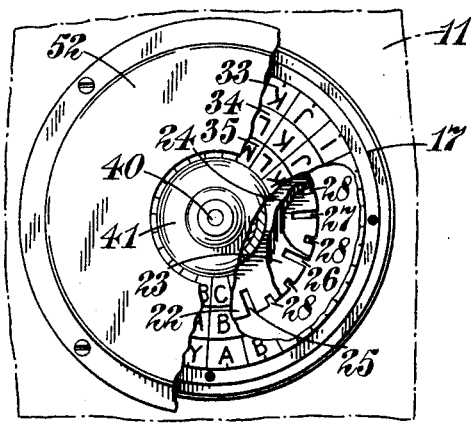
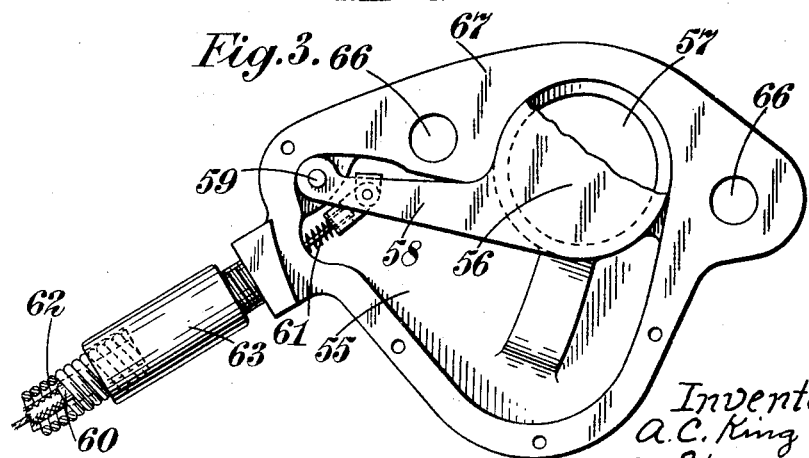
Inventors:
A. C. King &
J. Stinger,
By Byrnes, Stebbins & Parmelee,
attys.

Patented Nov. 13, 1928.

1,691,484

UNITED STATES PATENT OFFICE.

ALFRED CHARLES KING AND JAMES STRINGER, OF LONDON, ENGLAND, ASSIGNORS TO KING, STRINGER & COMPANY LIMITED, OF LONDON, ENGLAND, A BRITISH COMPANY.

ANTITHEFT DEVICE FOR MOTOR VEHICLES.

Application filed April 26, 1927, Serial No. 186,732, and in Great Britain May 3, 1926.

This invention is for improvements in or relating to electric switches, and has for its object to provide an improved construction of locking switch for use in a motor vehicle ignition circuit, to prevent the use, by unauthorized persons, of the motor vehicle.

According to this invention there is provided for a motor vehicle ignition circuit a locking-switch comprising in combination a switch-blade and a permutation lock therefor, characterized in that the device is mounted on the dash-board with the setting dials of the lock in front of the board and the switch-blade and its co-operating locking parts behind the board.

According to a convenient construction such locking switch comprises a plurality of coaxial setting dials mounted respectively on nested coaxial tubes, which tubes extend through the dashboard, a corresponding plurality of radially-slotted locking-discs respectively secured behind the dashboard on said tubes, a pivoted switch-blade adapted to engage said discs to be locked against movement or released thereby, and an operating-rod for said blade extending axially through said nested tubes to the front of the dashboard.

The connection of the operating rod to the switch-blade may be made weak, so that a hammer-blow upon the operating rod will break the said connection rather than permit the switch-blade to be forced into unlocked position.

According to a further feature of the invention a switch, as hereinbefore described, may have in combination with the setting dials of the locking-switch a removable cover normally to conceal the setting dials from view. It will be appreciated that whilst the motor vehicle engine is running the switch is in its unlocked position, and consequently in the absence of a cover, the correct setting of the dial to unlock the switch is visible, and might be seen with little difficulty by an unauthorized person. The provision of a cover renders the acquisition of this information more difficult.

According to another feature of this invention the radial slot in each of the discs, which is entered by the switch-blade, may be extended at its inner end in a circumferential direction for the purpose of enabling the discs to be moved after the switch has been engaged with them, and thereby destroy the key setting of the lock.

According to yet another feature of this invention there may be provided a shutter or valve which is fitted to the induction-pipe of the engine and is operatively connected with the switch-blade so as to open or close the induction-pipe according as the ignition circuit is rendered available or put out of action. An additional safeguard against theft of the vehicle is thereby provided.

In the accompanying drawings, which illustrate one embodiment of this invention—

Figure 1 is a central section;

Figure 2 is an end elevation of Figure 1, but with parts broken away; and

Figure 3 is a view showing the shutter to be fitted to the induction-pipe.

Like reference characters indicate like parts in all the figures.

Referring to Figure 1 the devices comprises a substantially cylindrical casing 10 which is mounted on the back of the dashboard 11 of a motor vehicle, being secured thereto by screws 12 which pass through the end wall 13 of the casing and have their heads situated inside the casing 10. The casing is provided with a screwed-on cover or end 14 which is removed in order to give access to the screws 12 when inserting them. Alternatively, it may be secured by screws extending through the dash-board from a front plate secured on the other side of the dash-board, this front plate being itself secured by screws concealed under the dials hereinafter mentioned.

A hole is provided in the dash-board to align with a central opening in the end wall 13 of the casing 10, and a bush 15 may be fitted in this hole if so desired, to facilitate the mounting of the device on a dash-board. Within the bush 15 there is mounted another bush 16 which carries a flange 17 adapted to lie against the front of the dash-board 11. This bush 16 extends into the casing 10 and is screw-threaded on that end to receive a nut 18 which bears on the inner face of the end 13 of the casing and retains the bush 16 firmly in place.

Within this bush 16 there are mounted a series of concentric tubes, of which any desired number may be provided, three being shown in the drawing at 19, 20, 21 respectively. These tubes may each be integral throughout its length, or they may each be made in two parts tongued and slotted on their adjacent ends so as to permit the two parts to be adjusted axially towards and away from one another whilst retaining their rotative engagement. These tubes are stepped in length and each of them carries on that end situated inside the casing 10 a disc as shown at 22, 23, 24 respectively. These discs are preferably all of the same diameter and the tubes whereto they are fixed are of such length that the discs lie closely one upon the other; each disc is provided with a slot extending radially inwards from its edge as shown most clearly in Figure 2 at 25, 26, 27 respectively. These slots are capable of being registered with one another by rotation of the discs in the manner hereinafter described. Each disc is, furthermore, provided with a number of shorter slots extending radially inwards from its periphery, these also being indicated in Figure 2 at 28. Spring-detents may be provided to engage these slots to assist in locating the discs if so desired. The discs are secured on their respective tubes in any convenient manner so as to rotate therewith, and if the tubes are slotted and tongued as above described, the discs are so mounted that the position of the long slots bears no definite relationship to the position of the tongues on the tubes.

The tubes 19, 20, 21 extend outwards to the front of the dash-board and each carries a circular plate secured on it, the lengths of the tubes being such that these plates are spaced apart axially. These plates are indicated at 29, 30, 31 respectively and upon each of them there rests a disc of ebonite or other suitable material, the discs being locked respectively to their plates by means of dowel-pins fixed on the plates as shown, for example, at 32. These dowel-pins engage holes in the ebonite discs and each disc may be provided, for the purpose hereinafter described, with a plurality of holes to engage each dowel-pin, so that the disc can be adjusted relatively to its plate before being locked thereto.

Preferably, the various discs are shaped as shown at 33, 34, 35, so as to provide a general conical formation to the assemblage and each of the discs has engraved or otherwise marked upon its exposed edge a series of characters, such as letters of the alphabet. A pointer or mark or several such pointers or marks on some fixed part of the device indicates the setting of a particular character on each of the discs, and by providing several pointers, the chance of finding the correct setting of all the discs with the correct pointer is correspondingly diminished.

A bush 36 is mounted inside the innermost of the three tubes aforesaid and is provided at its outer end with a flange 37 which abuts the uppermost disc 35, to retain the assemblage of these discs in place, the inner end of the bush 36 being screw-threaded to receive nuts 38 screwed against a disc or washer 39 which abuts the end of the innermost tube 21 and its disc 24. Instead of locknuts, the bush 36 may be slotted, and a spring-detent engaged in said slot to retain the discs in position relatively to it. Within the bush 36 there is mounted a rod 40 which is capable of endwise movement therein and is provided at its upper end with a knob or handle of convenient shape 41 to facilitate such movement.

The casing 10 aforesaid is provided with a diametrical bridge-piece 42 whereto lugs 43 are fitted to receive a hinge-pin 44 for a pivoted switch-blade 45. The rod aforesaid is pin-jointed at 46 to the blade so that the axial movement aforesaid of the rod swings the blade 45 on its hinge-pin 44; the free end of this blade 45 is arranged to co-operate with contacts 47 and 48 mounted on suitable insulating material.

The rear end of the switch-blade 45 beyond the pivot-pin 46 is up-turned as at 49 so as to lie in proximity to the discs 22, 23, 24 and this part 49 is so positioned and shaped relatively to the part 45 that the part 45 can only engage the contact 47 when the deep slots 25, 26, 27 on the discs are brought into register with one another in such a position that the end of the part 49 can enter them, as shown in Figure 1. If the blade 45 be moved away from the contact 47 so that the end 49 is disengaged from the slots in the discs 22, 23, 24, these discs can be rotated to take their deep slots out from register with the part 49, and the switch is then locked in this postion, in which it engages the contact 48. The rod 40, or its connection with the blade 45 is so constructed as to be weaker than the part 49, or the pivot-pin 44, so that a hammer-blow on the rod 40 will not bring the blade 45 into engagement with the contact 47, but will merely break some part of the mechanism.

When the device is used to control the ignition circuit of the motor vehicle, one or other of the contacts 47, 48 is used according as the system employs a coil or magneto. If both systems are used the coil is connected to the contact 47 and the magneto to the contact 48, thus in the locked position the circuit containing the coil is broken whilst that containing the magneto is short-circuited, that is to say, the connection is such that the ignition system is inoperative when the switch is in its "locked" position. The setting of the discs 22, 23, 24 is determined by the alignment of the particular characters on the discs 33, 34, 35 with the index aforesaid, and the particular combination of characters need be known only to the driver or owner of the vehicle. Owing to the relative adjustability of the discs 33, 34, 35, on their companion plates 29, 30, 31 by means of the dowel-pins aforesaid, the particular combination of characters can be varied at will.

The use of the small notches 28 on the discs 22, 23, 24 prevents the correct setting of the discs being determined by pressing the part 49 into contact with the edges of these discs and then rotating them until it slips in, for it will slip into a short notch and there is no method of distinguishing which of the three discs presents a short notch and which a long notch.

In order to prevent access to the interior of the casing 10, or its easy removal, the cover 14 aforesaid is arranged to be screwed onto the casing 10 and locked against unscrewing by the switch when it is in its "locked" position as above described. This is effected by means of a lug or tail-piece 50 formed integrally with, or secured on, the switch-blade 45 in such position that when the latter is moved into its locked position the lug 50 swings into position beside a lug 51 formed or secured on the cover 14 in such a position as to prevent rotation and unscrewing thereof.

A cover or lid may be provided for the dials 33, 34, 35, as shown at 52, this cover preferably being hinged at 53 and provided with a simple detent or snap-fastening 54 so that it can be readily swung open when it is desired to adjust the dials, but conceals the setting of the dials for the operation of the switch.

Instead of or in addition to using the cover 52, the deep slots may each be provided with a circumferential extension at its inner end so that when they have been aligned and the tail-piece 49 engaged with them, the discs can be rotated to destroy the key setting. With this arrangement there is very little possibility of the setting becoming known to unauthorized persons since it need be used only for the purpose of adjusting the switch or when switching on or off, and at all other times some other setting is given to the dials.

An additional safeguard to prevent the use of the engine is provided by means of a shutter in the induction-pipe. As illustrated in Figure 3 a hollow plate-like member 55 is arranged to be inserted between the carburetor and the induction-pipe where they are ordinarily bolted together. Conveniently this member is formed as a shallow casting illustrated in Figure 3 on the top of which a plate, not shown, is secured. The casting is recessed to provide accommodation for a shutter 56 which is movable so as close or open an orifice 57 which registers with the bore of the induction-pipe. The shutter 56 is secured on the end of an arm 58 pivoted at 59 so as to swing in its own plane. The operating movement of this shutter is imparted to it by a Bowden wire 60 or like mechanism which is itself coupled to the switch-member 45 or to the tail-piece 49 thereof, the arrangement being such that when the ignition circuit is rendered inoperative the shutter 56 is moved into the position in which it closes the orifice 57. Preferably a spring 61 is arranged so as normally to hold the shutter in its closing position.

In order to prevent interference with the operating mechanism of the shutter, the Bowden wire is enclosed in a helix of steel wire 62, this helix extending from the tubular casing 63 into the casing of the switch. The member 55 is secured between the carburetor and the induction-pipe, either by bolts extending through holes 66 in the flange-like part 67, or if it is desired, rivets may be used instead of bolts, in order to render the detachment more difficult. The use of rivets does not offer any serious disadvantage in practice, for it is very rarely required to move the carburetor after it has been installed.

We claim:

1. In an anti-theft device for a motor-car, the combination of a plurality of coaxial setting dials of a permutation lock, a corresponding plurality of locking discs, a plurality of coaxial tubes each connecting a setting disc to a locking disc, said locking discs each being provided with a plurality of radial notches whereof one is deeper than the others, a switch blade pivotally mounted near said locking discs, a co-operating contact for said switch blade, a tail-piece on said blade adapted to enter said notches and to be permitted only by said deeper notches to move so far as to permit the switch blade to engage the said contact, and an operating rod connected to said switch blade extending coaxially through said tubes.

2. In an anti-theft device for a motor-car, the combination of a plurality of coaxial setting dials of a permutation lock, a corresponding plurality of locking discs, a plurality of coaxial tubes each connecting a setting disc to a locking disc, said locking discs each being provided with a plurality of radial notches whereof one is deeper than the others, a switch-blade pivotally mounted near said locking discs, a co-operating contact for said switch blade, a tail-piece on said blade adapted to enter said notches and to be permitted only by said deeper notches to move so far as to permit the switch blade to engage the said contact, and an operating rod extending coaxially through said tubes and means connecting said rod to said switch blade, which means are of less strength than the rest of the mechanism.

3. In an anti-theft device for a motor-car, the combination of a plurality of coaxial setting dials of a permutation lock, a corresponding plurality of locking discs, a plurality of coaxial tubes each connecting a setting disc to a locking disc, said locking discs each being provided with a plurality of radial notches whereof one is deeper than the others and is provided with a circumferential extension at its radially inner end, a switch blade pivotally mounted near said locking discs, a co-operating contact for said switch blade, a tail-piece on said blade adapted to enter said notches and to be permitted only by said deeper notches to move so far as to permit the switch blade to engage the said contact, and an operating rod connected to said switch blade extending coaxially through said tubes.

4. In an anti-theft device for a motor-car, the combination of a plurality of coaxial setting dials of a permutation lock, a corresponding plurality of locking discs, a plurality of coaxial tubes each connecting a setting disc to a locking disc, said locking discs each being provided with a plurality of radial notches whereof one is deeper than the others, a switch blade pivotally mounted near said locking discs, a co-operating contact for said switch blade, a tail-piece on said blade adapted to enter said notches and to be permitted only by said deeper notches to move so far as to permit the switch blade to engage the said contact, an operating rod connected to the said switch blade extending coaxially through said tubes, a casing enclosing said locking discs and switch blade, a cover having screwed engagement with said casing, and a projection on said cover so positioned as to be engaged by said tail-piece when it is disengaged from said locking discs.

5. In an anti-theft device for a motor-car, the combination of a plurality of coaxial setting dials of a permutation lock, a corresponding plurality of locking discs, a plurality of coaxial tubes each connecting a setting disc to a locking disc, said locking discs each being provided with a plurality of radial notches whereof one is deeper than the others, a switch blade pivotally mounted near said locking discs, a co-operating contact for said switch blade, a tail-piece on said blade adapted to enter said notches and to be permitted only by said deeper notches to move so far as to permit the switch blade to engage the said contact, an operating rod connected to said switch blade extending coaxially through said tubes, a valve situated in the induction-pipe of the engine of the car, and means operatively connecting said valve to said tail-piece to be moved thereby.

6. In an anti-theft device for a motor-car, the combination of a plurality of coaxial setting dials of a permutation lock, a corresponding plurality of locking discs, a plurality of coaxial tubes, each connecting a setting disc to a locking disc, said locking discs each being provided with a plurality of radial notches whereof one is deeper than the others, a switch blade pivotally mounted near said locking discs, a co-operating contact for said switch blade, a tail-piece on said blade adapted to enter said notches and to be permitted only by said deeper notches to move so far as to permit the switch-blade to engage the said contact, an operating rod connected to said switch blade extending coaxially through said tubes, a hollow flat casing, means for securing it to the induction-pipe of the engine of the car, a valve in said casing movable to open and close said induction-pipe and means operatively connecting said valve to said tail-piece.

In testimony whereof we have signed our names to this specification.

ALFRED CHARLES KING.
JAMES STRINGER.